US012585267B2

(12) United States Patent
Sucan et al.

(10) Patent No.: US 12,585,267 B2
(45) Date of Patent: * Mar. 24, 2026

(54) METHODS AND SYSTEMS FOR GRADUALLY ADJUSTING VEHICLE SENSOR PERSPECTIVE USING REMOTE ASSISTANCE

(71) Applicant: Waymo LLC, Mountain View, CA (US)

(72) Inventors: Ioan-Alexandru Sucan, Mountain View, CA (US); Collin Winter, Mountain View, CA (US); Chien-Yu Ko, Mountain View, CA (US); Vishay Nihalani, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,187

(22) Filed: Jun. 27, 2023

(65) Prior Publication Data

US 2023/0350405 A1 Nov. 2, 2023

Related U.S. Application Data

(63) Continuation of application No. 17/004,839, filed on Aug. 27, 2020, now Pat. No. 11,726,471.

(51) Int. Cl.
*G05D 1/00* (2024.01)
*B60W 60/00* (2020.01)

(52) U.S. Cl.
CPC ......... *G05D 1/0016* (2013.01); *B60W 60/001* (2020.02); *B60W 60/005* (2020.02); *G05D 1/0022* (2013.01); *G05D 1/0088* (2013.01)

(58) Field of Classification Search
CPC .. G05D 1/0016; G05D 1/0022; G05D 1/0088; G05D 1/0044; G05D 1/0038;
(Continued)

(56) References Cited

U.S. PATENT DOCUMENTS

| 2015/0248131 A1 | 9/2015 | Fairfield |
| 2018/0095466 A1 | 4/2018 | Allan |

(Continued)

FOREIGN PATENT DOCUMENTS

| CN | 104271419 A | 1/2015 |
| CN | 108700876 A | 10/2018 |

(Continued)

OTHER PUBLICATIONS

CN 110333718 A machine translation (Year: 2019).*
TESLA Motors APP, https://www.youtube.com/watch?v=vlVFhT-Djnl, Mar. 7, 2016 (Year: 2016).*

*Primary Examiner* — Anne Marie Antonucci
*Assistant Examiner* — Jingli Wang
(74) *Attorney, Agent, or Firm* — McDonnell Boehnen Hulbert & Berghoff LLP

(57) ABSTRACT

Example embodiments relate to gradually adjusting a vehicle sensor perspective using remote assistance. A computing device may receive a request for assistance from a vehicle operating in an environment. The request indicates that the vehicle is stopped at a location with a sensor perspective of the environment that is at least partially occluded. Responsive to receiving the request for assistance, the computing device may display a graphical user interface (GUI) that represents a current state of the vehicle and includes a selectable option configured to enable the vehicle to gradually move forward a predefined distance. The computing device may detect a selection of the selectable option and transmit instructions that enable the vehicle to gradually move forward the predefined distance. The vehicle can then (Continued)

gradually move forward the predefined distance while also monitoring for one or more changes in the environment responsive to receiving the instructions.

20 Claims, 16 Drawing Sheets

(58) Field of Classification Search
CPC .............. B60W 60/001; B60W 60/005; G08G 1/0968; G08G 1/096725; G08G 1/0969
See application file for complete search history.

(56) References Cited

U.S. PATENT DOCUMENTS

| | | | |
|---|---|---|---|
| 2019/0019416 A1 | 1/2019 | Perko | |
| 2019/0196464 A1 | 6/2019 | Lockwood | |
| 2020/0183394 A1* | 6/2020 | Lockwood | .............. G06N 7/00 |
| 2020/0348665 A1 | 11/2020 | Bhanushali | |
| 2020/0409352 A1 | 12/2020 | Caldwell | |

FOREIGN PATENT DOCUMENTS

| | | | |
|---|---|---|---|
| CN | 109808701 A | | 5/2019 |
| CN | 110333718 A | * | 10/2019 |
| WO | 2018132608 A2 | | 7/2018 |
| WO | 2018132608 A3 | | 7/2018 |

* cited by examiner

SELECT TO ENABLE VEHICLE TO MOVE FORWARD DISTANCE SHOWN

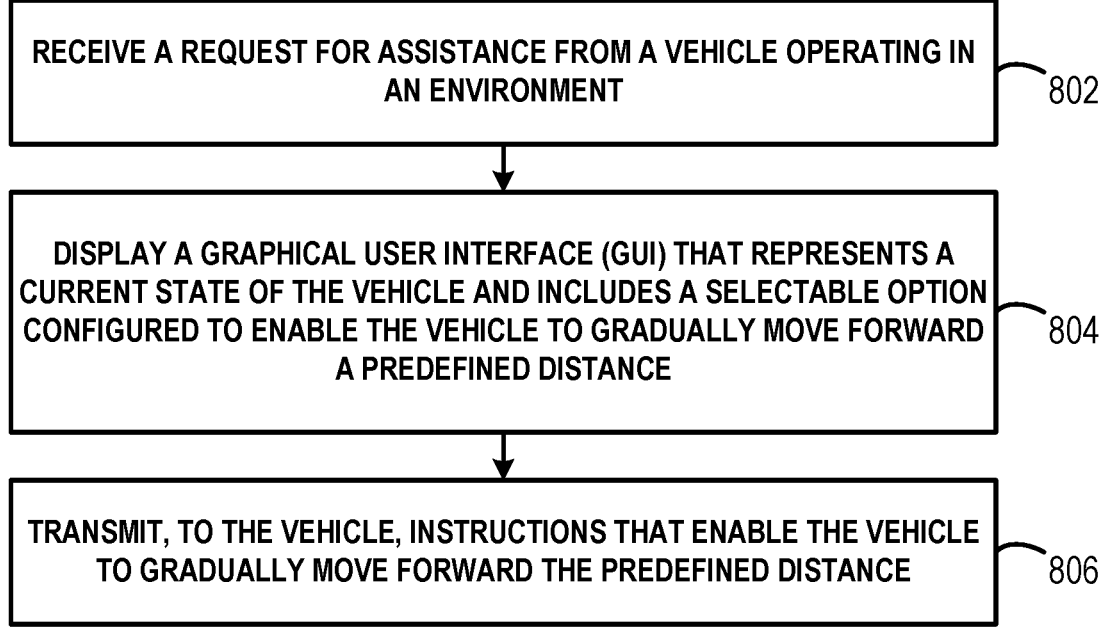

RECEIVE A REQUEST FOR ASSISTANCE FROM A VEHICLE OPERATING IN AN ENVIRONMENT ⟩ 802

DISPLAY A GRAPHICAL USER INTERFACE (GUI) THAT REPRESENTS A CURRENT STATE OF THE VEHICLE AND INCLUDES A SELECTABLE OPTION CONFIGURED TO ENABLE THE VEHICLE TO GRADUALLY MOVE FORWARD A PREDEFINED DISTANCE ⟩ 804

TRANSMIT, TO THE VEHICLE, INSTRUCTIONS THAT ENABLE THE VEHICLE TO GRADUALLY MOVE FORWARD THE PREDEFINED DISTANCE ⟩ 806

Figure 8

METHODS AND SYSTEMS FOR GRADUALLY ADJUSTING VEHICLE SENSOR PERSPECTIVE USING REMOTE ASSISTANCE

CROSS REFERENCE TO RELATED APPLICATION

The present application is a continuation of U.S. patent application Ser. No. 17/004,839, filed on Aug. 27, 2020, the entire contents is hereby incorporated by reference.

BACKGROUND

Vehicles are used to complete various types of tasks, including object and people transportation. With advances in technology, some vehicles are configured with systems that enable the vehicles to operate in a partial or fully autonomous mode. When operating in a partial or fully autonomous mode, some or all of the navigation aspects of vehicle operation are controlled by a vehicle control system rather than a traditional human driver. Autonomous operation of a vehicle can involve systems sensing the vehicle's surrounding environment to enable a computing system to plan and safely navigate.

SUMMARY

Example embodiments describe techniques for gradually adjusting vehicle sensor perspective using remote assistance. The techniques may enable remote operators to provide assistance, which can enable autonomous vehicles to slowly adjust positions and overcome situations when the vehicle is stranded with vehicle sensors partially occluded and therefore unable to gather enough information to determine a safe navigation strategy.

In one aspect, an example method is provided. The method may involve receiving, at a computing device, a request for assistance from a vehicle operating in an environment. The request indicates that the vehicle is stopped at a location with a sensor perspective of the environment that is at least partially occluded. The method may further involve, responsive to receiving the request for assistance, displaying, by the computing device, a graphical user interface (GUI) that represents a current state of the vehicle and includes a selectable option configured to enable the vehicle to gradually move forward a predefined distance. The method may also involve, based on detecting a selection of the selectable option, transmitting, by the computing device and to the vehicle, instructions that enable the vehicle to gradually move forward the predefined distance. The vehicle is configured to gradually move forward the predefined distance while also monitoring for one or more changes in the environment responsive to receiving the instructions.

In another aspect, an example system is provided. The system may include a vehicle and a computing device. The computing device is configured to receive a request for assistance from the vehicle operating in an environment. The request indicates that the vehicle is stopped at a location with a sensor perspective of the environment that is at least partially occluded. The computing device is further configured to, responsive to receiving the request for assistance, display a graphical user interface (GUI) that represents a current state of the vehicle and includes a selectable option configured to enable the vehicle to gradually move forward a predefined distance. The computing device is also configured to, based on detecting a selection of the selectable option, transmit, to the vehicle, instructions that enable the vehicle to gradually move forward the predefined distance. The vehicle is configured to gradually move forward the predefined distance while also monitoring for one or more changes in the environment responsive to receiving the instructions.

In yet another example, an example non-transitory computer readable medium having stored therein program instructions executable by a computing system to cause the computing system to perform functions is provided. The functions may include receiving a request for assistance from a vehicle operating in an environment. The request indicates that the vehicle is stopped at a location with a sensor perspective of the environment that is at least partially occluded. The functions may also include, responsive to receiving the request for assistance, displaying a graphical user interface (GUI) that represents a current state of the vehicle and includes a selectable option configured to enable the vehicle to gradually move forward a predefined distance. The functions may also include, based on detecting a selection of the selectable option, transmitting, to the vehicle, instructions that enable the vehicle to gradually move forward the predefined distance. The vehicle is configured to gradually move forward the predefined distance while also monitoring for one or more changes in the environment responsive to receiving the instructions.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8 is a flow chart of a method, according to example implementations.

DETAILED DESCRIPTION

Figure 1:
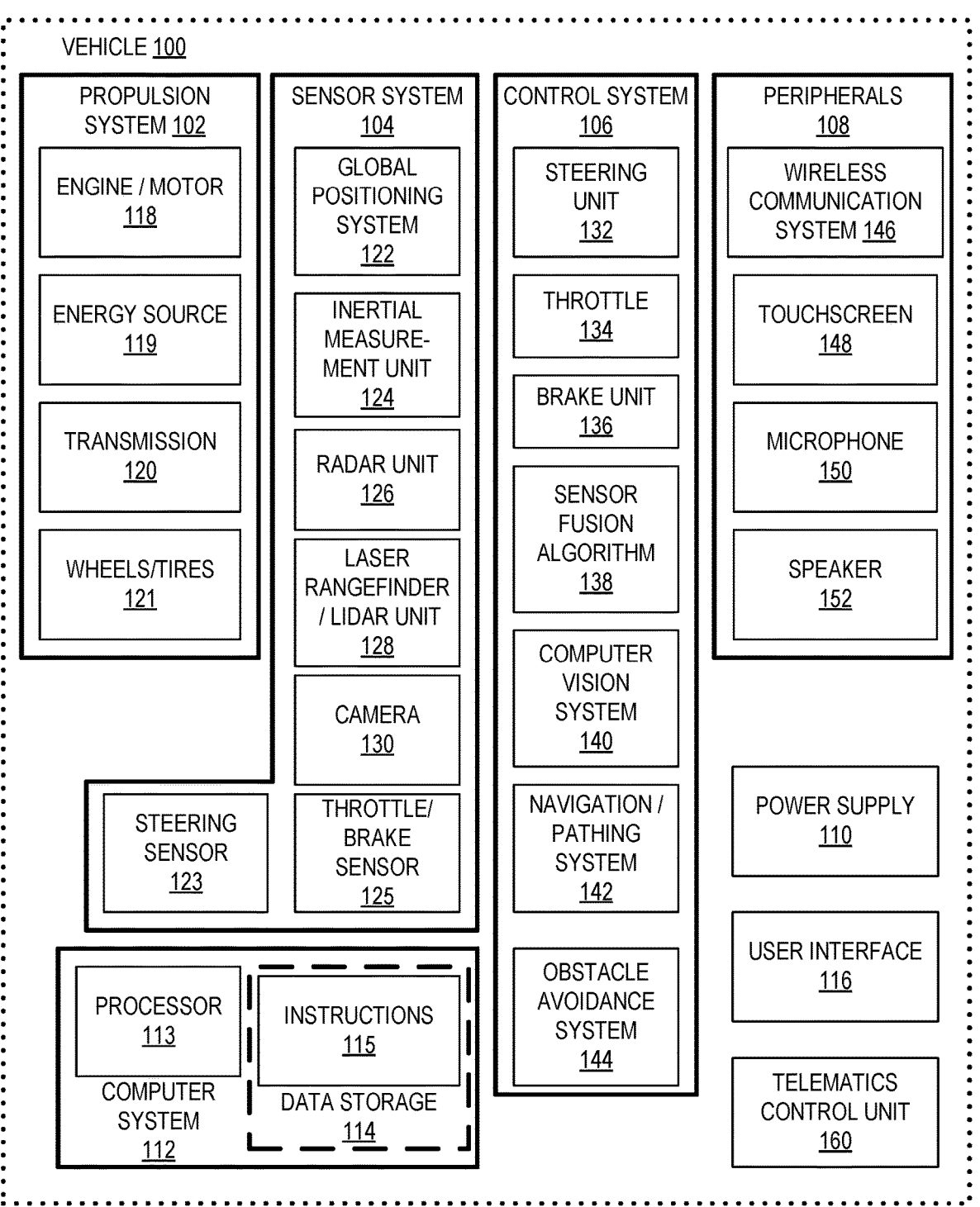
FIG. 1 is a functional block diagram illustrating a vehicle, according to example implementations.
Figure 2A:
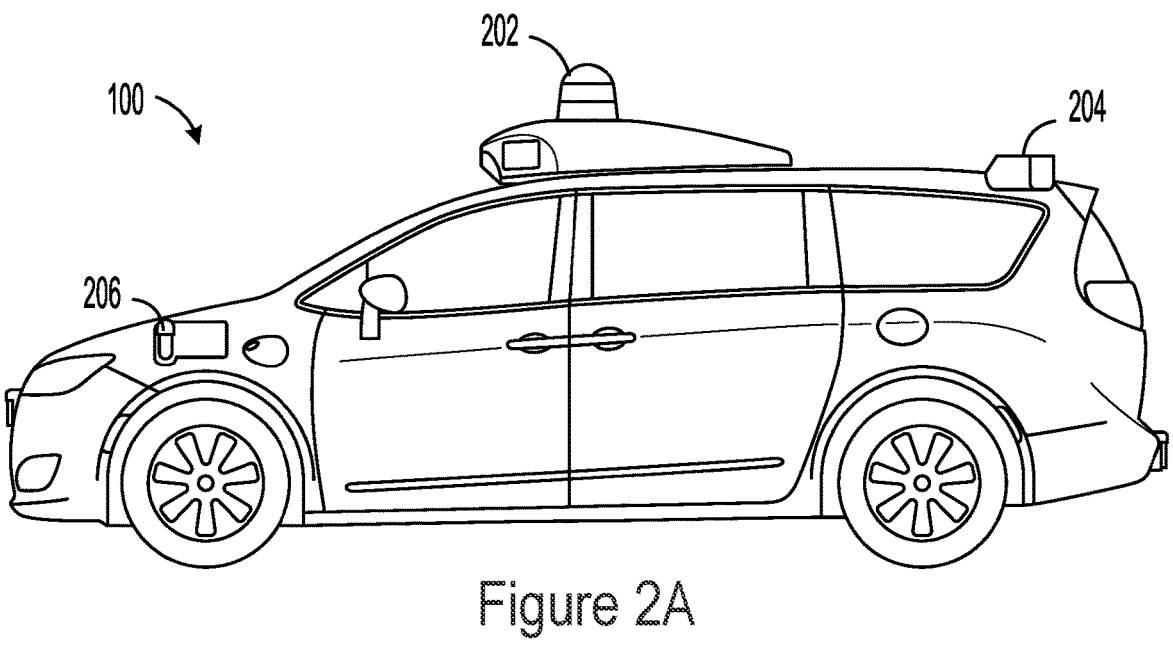
FIG. 2A illustrates a side view of a vehicle, according to one or more example embodiments.
Figure 2B:
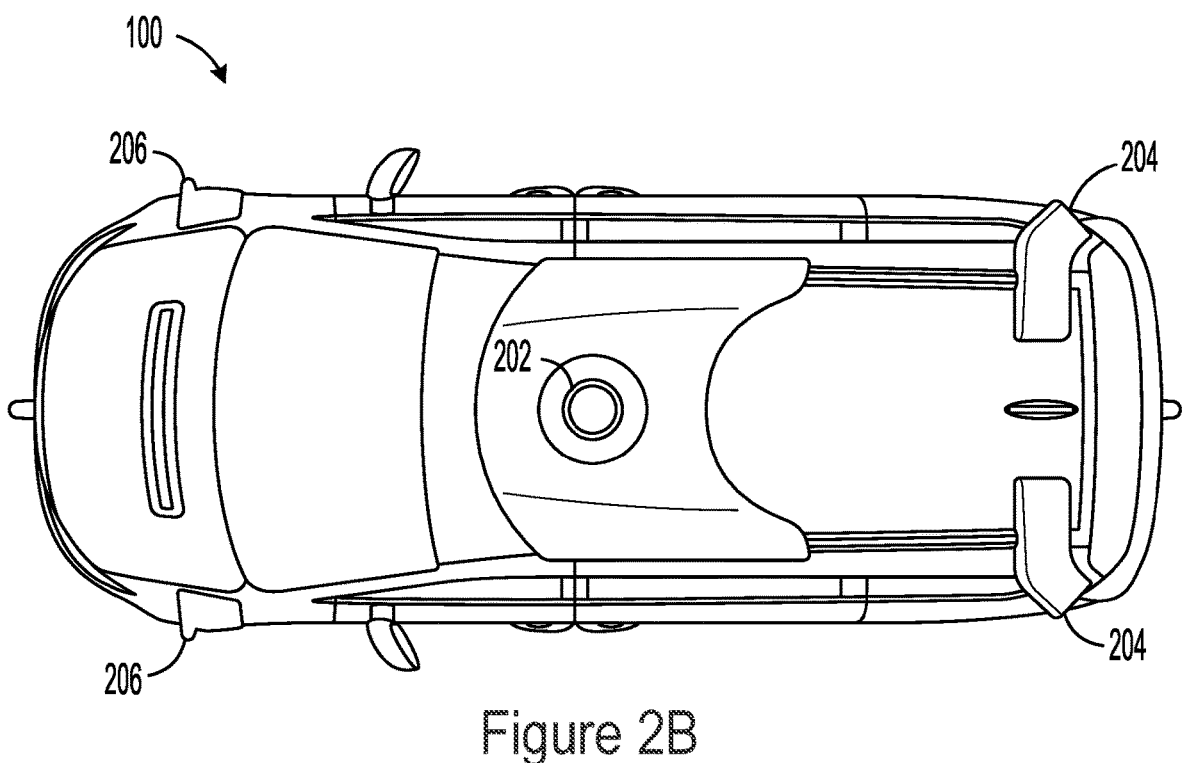
FIG. 2B illustrates a top view of a vehicle, according to one or more example embodiments.
Figure 2C:
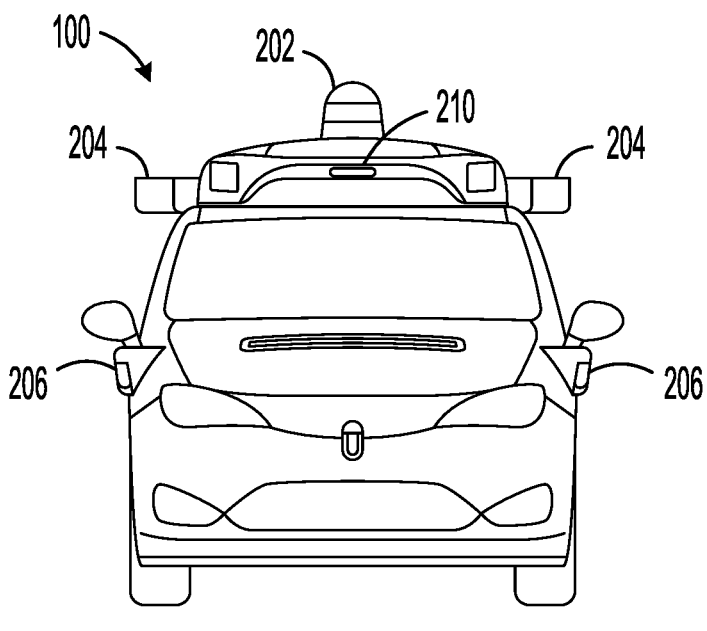
FIG. 2C illustrates a front view of a vehicle, according to one or more example embodiments.
Figure 2D:
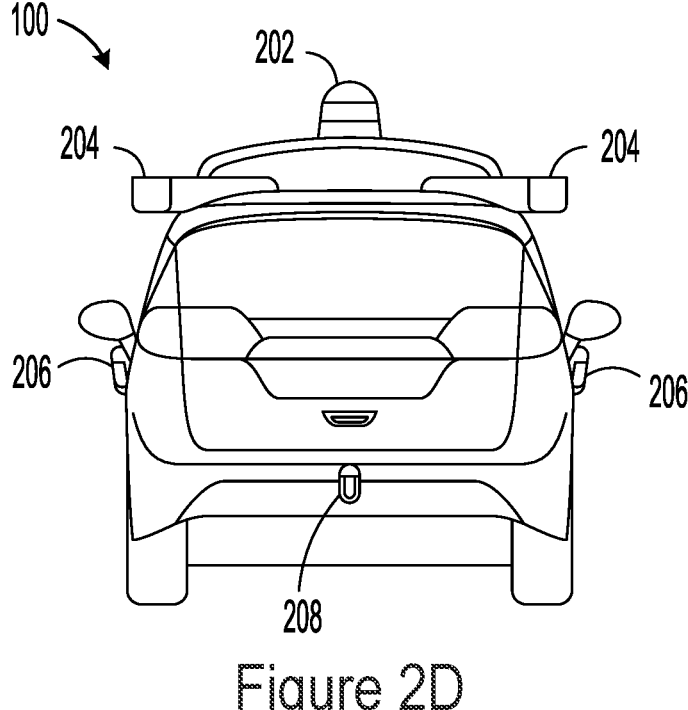
FIG. 2D illustrates a back view of a vehicle, according to one or more example embodiments.
Figure 2E:
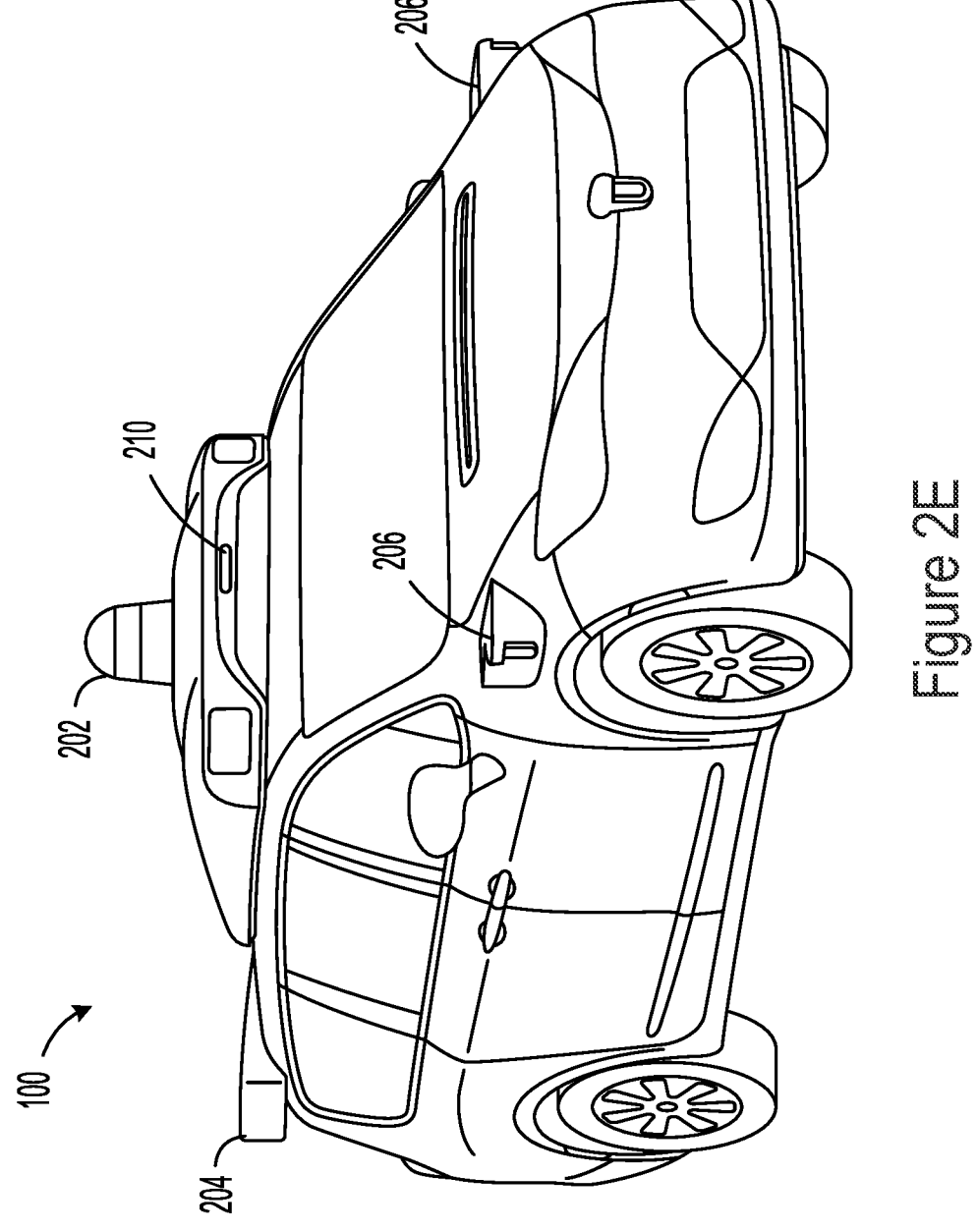
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Advancements in computing, sensors, and other technologies have enabled vehicles to safely navigate autonomously between locations without requiring input from a driver. By processing measurements of the surrounding environment from vehicle sensors in near real-time, an autonomous vehicle can transport passengers or objects between locations while avoiding obstacles, obeying traffic requirements, and performing other necessary actions that are typically conducted by a driver. The shift of control of the vehicle over to a vehicle control system can permit passengers to devote their attention to tasks other than driving.

The rise of autonomous-capable vehicles may contribute to an increase usage of vehicle-sharing. Vehicle-sharing can often involve a fleet of vehicles that are centrally-managed by an overall system that is configured to receive requests from potential passengers and dispatch nearby vehicles to locate, pick up, and provide rides to passengers in exchange for a fee. Within the fleet, each vehicle may fulfill requests for rides from passengers. For instance, a passenger may use a smartphone application or another computing device to submit a request to the system managing the fleet of vehicles. A request from a potential passenger may include information to assist the system complete the request, such as a current location of the passenger, a quantity of passengers that plan on receiving transportation, and one or more desired destinations for the vehicle to drop off passengers. In response to receiving the request, the system may identify and dispatch a vehicle within the fleet that can quickly travel to the passenger's current location and autonomously transport the passenger or passengers to one or more desired destinations accordingly. After completing a ride request, the vehicle may subsequently be dispatched to provide transportation for other passengers.

Whether operating as part of a vehicle-sharing fleet or independently, a vehicle capable of autonomous or semi-autonomous operation may encounter some situations where the vehicle systems can benefit from additional assistance.

In particular, the vehicle systems enabling autonomous operation may request for remote assistance to overcome some potential obstacles. A request for assistance may involve a vehicle communication interface (or another vehicle-based system) transmitting a request for assistance via wireless communication to a computing device positioned remotely from the vehicle. The request for assistance may include sensor data and other information that can help the remote computing device or a human operator use the computing device to provide some form of assistance to the vehicle that may help the vehicle overcome the current situation. Further details regarding the communication of requests for assistance, information within a given request, and management of requests are disclosed herein.

Vehicles may submit requests for assistance to obtain human input to help resolve a variety of situations that a human driver may be able to overcome. In some instances, a vehicle autonomously navigating the environment may encounter situations where the vehicle's sensor perspective of the environment is partially occluded. Such a situation may cause the vehicle to remain stopped until the environment changes enough to obtain sensor measurements for safely proceeding. For example, a vehicle stopped at an intersection may have a sensor perspective that is partially occluded by parked cars, trees, signs, or other objects in the environment. When a human driver encounters this and similar situations, the driver might cause the vehicle to gradually move forward safely until the driver is safely able to see around the objects that were previously blocking the driver's perspective. While gradually moving forward, the driver might stop the vehicle in response to the environment, such as to avoid another vehicle traveling proximate the vehicle. Because these actions by the driver can quickly overcome such situations, it is desirable to enable an autonomous vehicle to replicate actions similar to those performed by the driver in a safe manner.

Example embodiments described herein relate to systems and techniques for gradually adjusting vehicle sensor perspective using remote assistance. When an autonomous vehicle encounters a situation where navigation progress is impeded by an occluded sensor perspective of the environment, the autonomous vehicle may obtain remote assistance that can help the vehicle quickly overcome the situation. Remote assistance techniques described herein can be utilized in various situations, such as when an autonomous vehicle is temporarily stranded at an intersection, a parking lot, in an area with road constructions, or other potential navigation environments.

To further illustrate, a remotely positioned computing device associated with a remote operator may initially receive a request for assistance from a vehicle operating in an environment. For instance, the vehicle may be autonomously navigating a neighborhood or city and encounter a situation that vehicle systems could better manage with some remote assistance. As such, the request for assistance received by the computing device may indicate details related to the vehicle's situation. For instance, the request may specify that the vehicle is currently stopped with a sensor perspective of the environment that is at least partially occluded by one or more objects, such as a parked car, a sign, shrubs, trees, pedestrians, or other objects. Responsive to receiving the request from the vehicle, the computing device may provide an interface (e.g., a graphical user interface (GUI)) for the human operator to review and subsequently provide assistance to the vehicle. Based on an input from the operator, the computing device may transmit instructions to the vehicle.

The GUI generated by the computing device to enable remote assistance can vary within embodiments. The GUI can be used to convey the situation encountered by the vehicle to the remote operator so that the remote operator can provide assistance to help resolve the situation. For example, the GUI may include images or other sensor data to help represent the situation encountered by the vehicle. The GUI can also represent other information, such as information relating to the vehicle (e.g., location, quantity of passengers, type of vehicle).

In some examples, the GUI produced by the computing device enables input from the remote operator. For instance, the computing device may provide an interface configured with a single selectable option, which when selected by the remote operator, causes the computing device to transmit instructions that enable the vehicle to gradually move forward a predefined distance at or below a threshold speed (e.g., less than 5 miles per hour (MPH)). Without such instructions from the remote operator, the vehicle's ability to modify its position may be limited. Upon reception of the instructions, however, the vehicle can be configured to gradually move forward the predefined distance based on the instructions while also monitoring the environment for changes that may require the vehicle to stop gradually moving forward.

In some embodiments, an autonomous vehicle may be limited to a set of operations during navigation. As such, instructions that originate based on an input or inputs from a remote operator may enable the vehicle to perform one or operations that are not included in the original set of operations. In other words, the operation set for an autonomous vehicle can differ depending on if the vehicle is executing operations based on instructions from a remote operator. For example, an autonomous vehicle may lack the ability to independently gradually move forward or backwards slowly at intersections to modify sensor perspective of the environment, but may be able to execute such operations upon receiving instructions from a remote operator. Operators can also help identify objects in the environment, adjust navigation routes, confirm or deny navigation options proposed by a vehicle, check on passengers, and perform other forms of remote assistance.

Remote assistance for vehicles can originate from a network of remote operators. For example, a vehicle may submit a request for assistance that is received at an entry point of the network. The entry point may connect the request with a remote operator that can provide assistance. The remote operator may be selected based on credentials associated with the remote operator that indicate the operator expertise to handle the type of assistance that is being requested and/or the operator's availability, among other potential parameters. The entry point may analyze information within the request to route requests for assistance accordingly. For example, the network of remote operators may be used to provide assistance to an entire fleet of autonomous vehicles.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
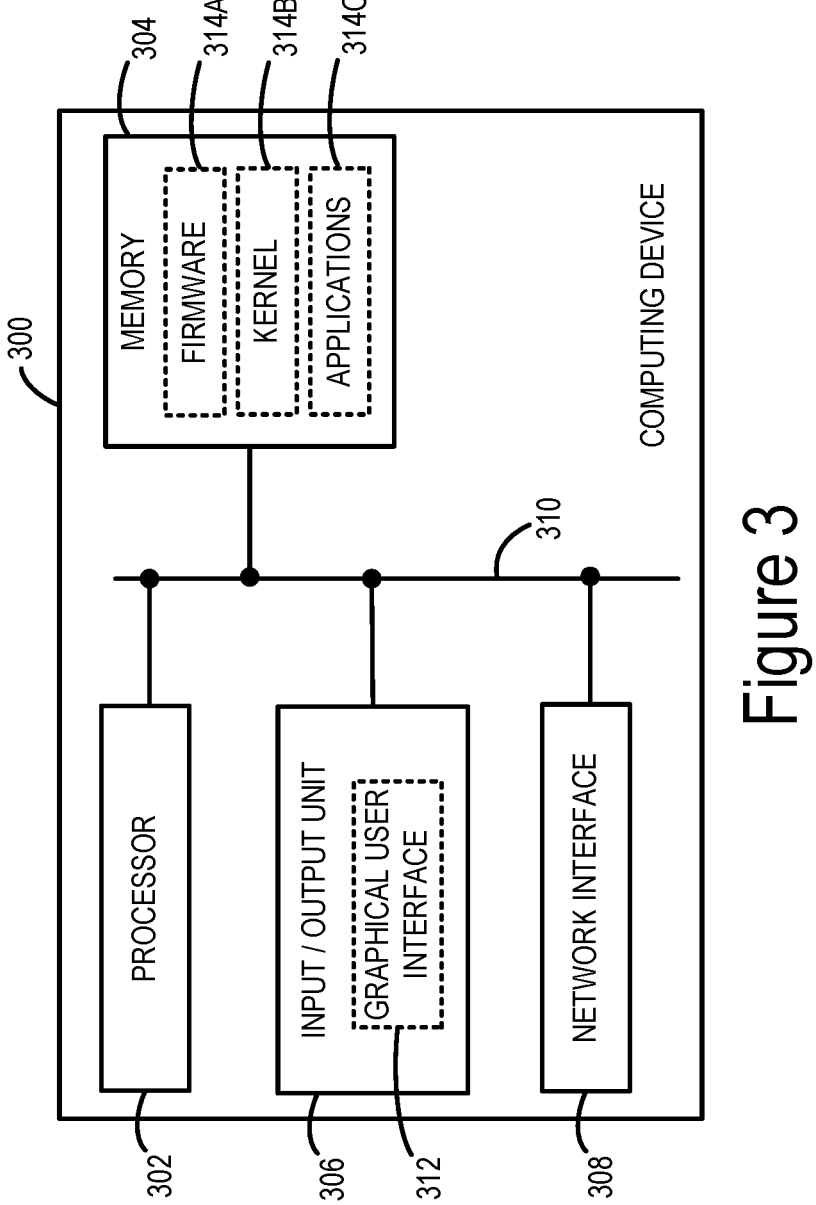
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide interface 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
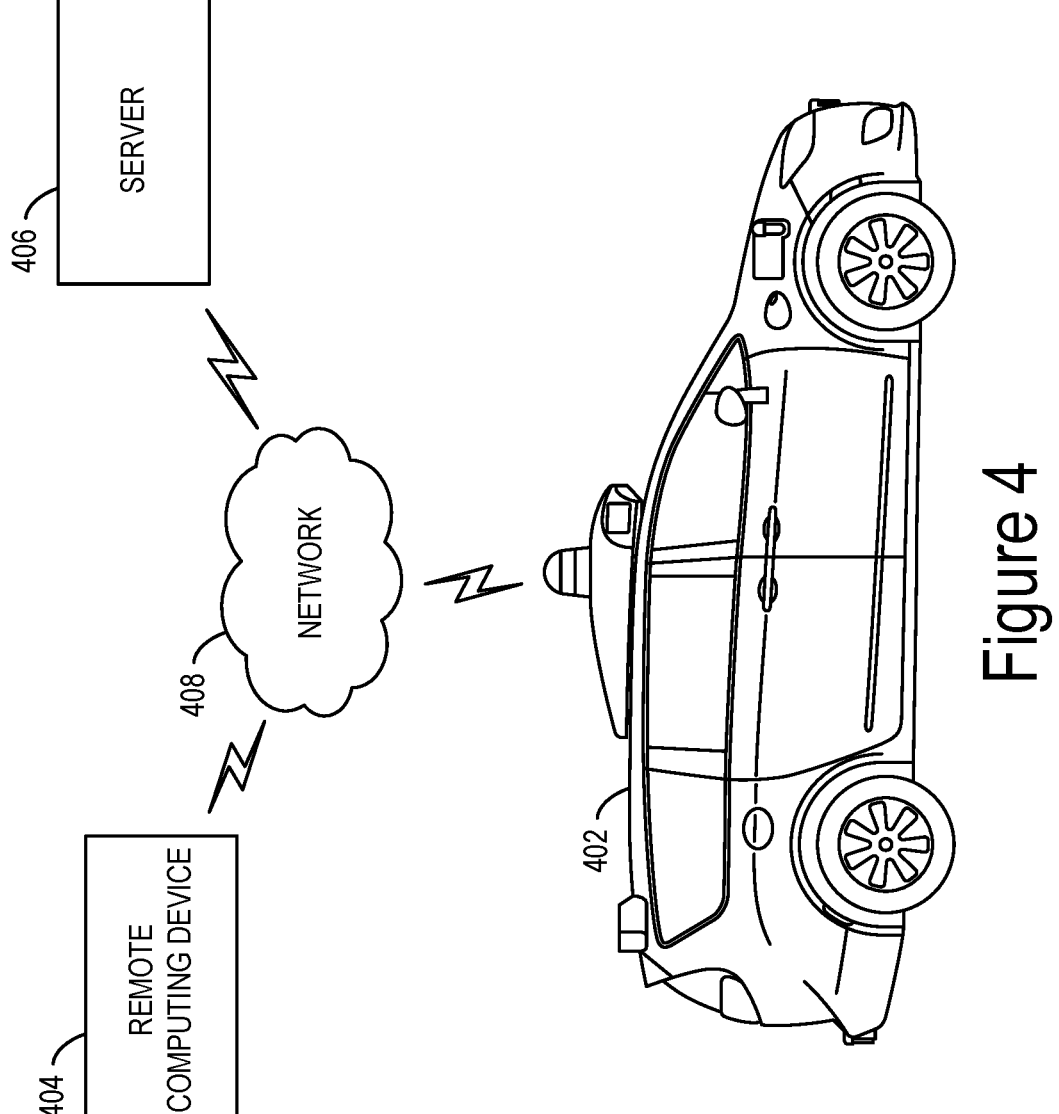
FIG. 4 is a system for wireless communication between computing devices and a vehicle, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may transport passengers or objects between locations, and may take the form of any one or more of the vehicles discussed above, including passenger vehicles, cargo shipping vehicles, farming and manufacturing vehicles, and dual-purpose vehicles. When operating in an autonomous mode, vehicle 402 may navigate with or without passengers enabling vehicle 402 to pick up and drop off passengers (or cargo) between desired destinations. In some embodiments, vehicle 402 can operate as part of a fleet configured to communicate with a remote operator that may use remote computing device.

Remote computing device 404 may represent any type of device related to remote assistance techniques, including but not limited to those described herein. Within examples, remote computing device 404 may represent any type of device configured to (i) receive information related to vehicle 402, (ii) provide an interface (e.g., a GUI, physical input interfaces) through which a human operator can in turn perceive the information and input a response related to the information, and (iii) transmit the response to vehicle 402 or to other devices (e.g., storage at server 406). As such, remote computing device 404 may take various forms, such as a workstation, a desktop computer, a laptop, a tablet, a mobile phone (e.g., a smart phone), a wearable device (e.g., a headset) and/or a server. In some examples, remote computing device 404 may include multiple computing devices operating together in a network configuration. In further embodiments, remote computing device 404 may resemble a vehicle simulation center with the remote operator positioned as the drive of the simulation center.

The position of remote computing device 404 relative to vehicle 402 can vary within examples. For instance, remote computing device 404 may have a remote position from vehicle 402, such as operating inside a physical building. In another example, remote computing device 404 may correspond to a computing device within vehicle 402 that is physically separate from vehicle 402, but with which a human operator can interact while as a passenger or driver of vehicle 402. In some examples, remote computing device 404 may be a computing device with a touchscreen operable by the passenger of vehicle 402.

In some implementations, operations described herein that are performed by remote computing device 404 may be additionally or alternatively performed by vehicle 402 (i.e., by any system(s) or subsystem(s) of vehicle 200). In other words, vehicle 402 may be configured to provide a remote assistance mechanism with which a driver or passenger of the vehicle can interact.

In addition, operations described herein can be performed by any of the components communicating via network 408. Particularly, remote computing device 404 may determine remote assist options for a human operator to review based on different levels of information provided by vehicle 402.

In some embodiments, vehicle 402 may determine potential options for remote computing device 404 to display. Potential options could include routes, vehicle movements, and other navigation parameters for review by remote computing device 404 and/or a remote operator using remote computing device 404. For example, vehicle 402 may determine that it is currently stranded (e.g., stopped) with a sensor perspective is partially blocked by objects preventing vehicle 402 from having a clear enough understanding of the environment to further navigate and subsequently request for remote assistance from a remote operator. Vehicle 402 may provide an option to allow remote operator to enable vehicle to creep forward (e.g., move forward gradually at or below a threshold speed) for a predefined distance to modify its sensor perspective of the environment.

In other embodiments, remote computing device 404 may analyze sensor data or other information from vehicle 402 to determine the situation and potential options for a remote operator to review. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing system 404 and vehicle 402 via network 408 (or perhaps directly with remote computing system 404 and/or vehicle 402). As such, server 406 may represent any computing device configured to receive, store, determine, and/or send information relating to vehicle 402 and the remote assistance thereof. As such, server 406 may be configured to perform any operation(s), or portions of such operation(s), that is/are described herein as performed by remote computing system 404 and/or vehicle 402. Some implementations of wireless communication related to remote assistance may utilize server 406, while others may not.

Network 408 represents infrastructure that can enable wireless communication between computing devices, such as vehicle, 402, remote computing device 404, and server 406. For example, network 408 can correspond to a wireless communication network, such as the Internet or a cellular wireless communication network. The various systems described above may perform various operations. These operations and related features will now be described.

In some examples, a remote computing system (e.g., remote computing system 404 or server 406) may operate in one of two modes. The first of these modes may serve, in essence, as a means for a human operator (of the vehicle and/or the remote computing system) to provide remote assistance support for the vehicle. The remote computing system may enable a human operator to provide this support in near real-time or less frequently than real-time.

The second of these two modes may serve as a means for keeping the human operator alert. The human operator may be a passenger or driver of the vehicle, or may be a third party located remotely from the vehicle but tasked with the responsibility of providing remote assistance to the vehicle (and possibly to other vehicles as well). Regardless of who the human operator is, it is desirable to keep the human operator alert so that the human operator can provide optimal remote assistance with minimal delay.

For instance, there may be scenarios in which the vehicle may not have requested remote assistance in a certain amount of time (e.g., one hour), and therefore the human operator tasked with providing remote assistance to the vehicle may not have taken any remote assistance action in that amount of time, which may be long enough where the human operator may become fatigued or otherwise less attentive than desirable. In these and other types of possible scenarios, it may be desirable to periodically prompt the human operator during this time, via the remote computing system, with alertness data to keep them alert. The alertness data may take various forms, such as archived images, audio, or video having confirmed or unconfirmed object identifications, also including generated natural-language questions regarding the confirmed or unconfirmed object identifications.

Remote assistance tasks may also include the human operator providing an instruction to control operation of the vehicle (e.g., instruct the vehicle to travel to a particular destination associated with an identified passenger). In some scenarios, the vehicle itself may control its own operation based on the human operator's feedback related to the identification of the object. For instance, upon receiving a confirmation that the occupancy of the vehicle meets a desired occupancy, the vehicle control system may cause the vehicle to safely transport the passengers to a requested destination.

In some examples, a remote operator can enable a vehicle to temporarily perform one or more operations to resolve a situation that the vehicle may normally not be permitted to perform. For instance, remote computing device 404 may be used to enable vehicle 402 to back up, navigate with a decreased buffer zone, or travel in a zone that is usually off limits (e.g., over the median or use a driveway). In some examples, a human operator may enable or instruct vehicle 402 to move forward one or more short distances at low speeds (e.g., under 5 MPH) to modify the sensor perspective of the environment of vehicle 402 or to modify its location to resolve another issue (e.g., blocking a sidewalk).

Figure 5:
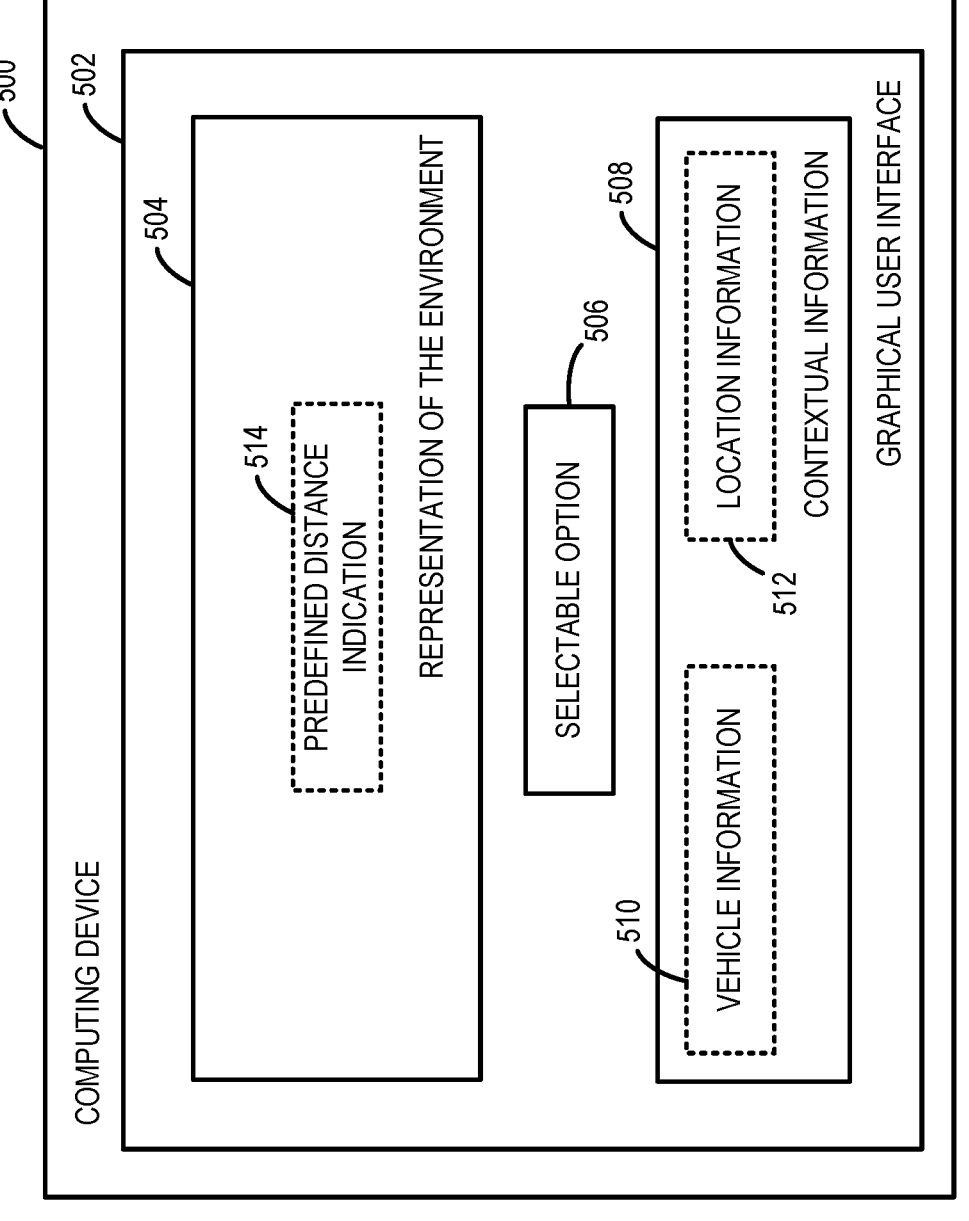
FIG. 5 illustrates a computing device displaying a graphical user interface for enabling remote assistance, according to one or more example embodiments.

FIG. 5 illustrates a computing device displaying a GUI for enabling remote assistance, according to one or more example embodiments. GUI 502 is shown displayed by computing device 500 and includes representation of the environment 504, selectable option 506, and contextual information 508. In other embodiments, GUI 502 may include more or less elements in other potential arrangements.

GUI 502 represents a system of interactive visual components for computer software. As such, GUI 502 can be used to display objects that convey information to a remote operator and also represent actions that can be taken by the remote operator. Computing device 500 can generate GUI 502 based on templates enabling an available remote operator to quickly review and provide assistance to a vehicle. Computing device may display GUI 502 on a display interface, such as a touch screen. In other examples, computing device may display GUI 502 or elements from GUI 502 via a display interface associated with a head-mounted wearable computing device (e.g., augmented reality).

Representation of the environment 504 is an object displayable via GUI 502 that can represent the current environment of a vehicle. By displaying representation of the environment 504, a remote operator may review the sensor perspective of the environment as captured by vehicle sensors. For instance, representation of the environment 504 may display images of the environment as captured by vehicle cameras. In other instances, sensor data from different types of sensors can be used to generate and provide representation of the environment 504 via GUI 502.

In some examples, computing device 500 may further obtain map data based on a location of the vehicle. For instance, the vehicle may provide GPS measurements or another indication of the vehicle's location. By using the vehicle's location, computing device 500 can acquire map data and further enhance the information included within representation of the environment 504 and/or other objects displayed via GUI 502. For example, computing device 500 can determine and display representation of environment 504 as an elevated view of the vehicle and nearby surroundings estimated based on the map data and the sensor data from the vehicle. In some examples, GUI 502 may include both a sensor perspective of the vehicle's environment and the elevated view estimated based on one or both of the sensor data and map data.

Representation of the environment 504 may also include predefined distance indication 514, which can be used to represent the distance that the remote operator may enable the vehicle to move gradually in order to adjust the sensor perspective of the environment for vehicle sensors. Computing device 500 may determine the predefined distance in various ways within examples. In one example, predefined distance indication 514 may represent a predefined distance that is preset for certain environment conditions. For instance, the predefined distance can depend on the vehicle having a location proximate to an intersection. In another example, predefined distance indication 514 may represent a predefined distance determined by computing device 500 specifically for the vehicle's situation that requires assistance. Particularly, computing device 500 may utilize sensor data and/or a suggested distance obtained from the vehicle to determine a predefined distance and subsequently represent that predefined distance using predefined distance indication 514.

Predefined distance indication 514 can be conveyed by GUI 502 in a variety of ways within examples. For instance, predefined distance indication 514 can involve a virtual placement of a mark (e.g., a line, a distance indication) positioned virtually relative to the vehicle within representation of the environment 504. Alternatively, predefined distance indication 514 can be shown as a distance without association to representation of the environment. For example, predefined distance indication 514 may propose enabling the vehicle to move one or two meters forward gradually. As indicated herein, moving forward gradually can involve the vehicle navigating forward in an idling mode or at or below a threshold speed (e.g., below 2 miles per hour (MPH)), which can enable sensors to slowly change orientation and position relative to objects in the environment. Such a creep forward technique can be used at intersections to see around parked vehicles, signs, pedestrians, bus stops, trees, shrubs, and other potential objects that can block sensor measurements of an area in the environment. In addition, the technique can also be used in parking lots and other situations where navigating the vehicle slowly would help assist the vehicle further navigate.

In some examples, predefined distance 514 may involve a vehicle backing up slowly. Such a technique may similar adjust the vehicle's sensor perspective of the environment.

Selectable option 506 represents an element of GUI 502 that a remote operator may select to provide instructions to the vehicle that enable the vehicle to gradually move forward the predefined distance, which may be presented by predefined distance indication 514. Particularly, selectable option 506 can be a virtual button, mark, or an object having another form that allows the remote operator to easily and clearly select to enable the vehicle to subsequently creep forward to modify its sensor perspective of the environment. In the embodiment shown in FIG. 5, selectable option 506 is the only option available for the selection by the remote operator. Particularly, the layout of GUI 502 shown with selectable option 506 as the only option simplifies the review process for the remote operator and also limits the instructions that the remote operator may choose from. In other examples, additional options may be included. For instance, in another embodiment, GUI 502 may display a first option for a first predefined distance and a second option for enabling the vehicle to travel a second predefined distance. Such a layout can enable the remote operator to have more influence in subsequent operations of the vehicle.

GUI 502 also includes contextual information 508, which may convey additional information to supplement a remote operator's understanding of the vehicle's situation. As shown in FIG. 5, contextual information 508 includes vehicle information 510 and location information 512. Vehicle information 510 may indicate a variety of information about the vehicle, such as the type of vehicle, the vehicle sensors on the vehicle, the quantity of the passengers, and target destination, etc. Location information 512 may represent information based on the current location of the vehicle, such as map data depicting the environment. Contextual information 508 may also specify information related to the situation, such as how long has the vehicle been stranded and a reason proposed by the vehicle for the stranding.

Figure 6A:
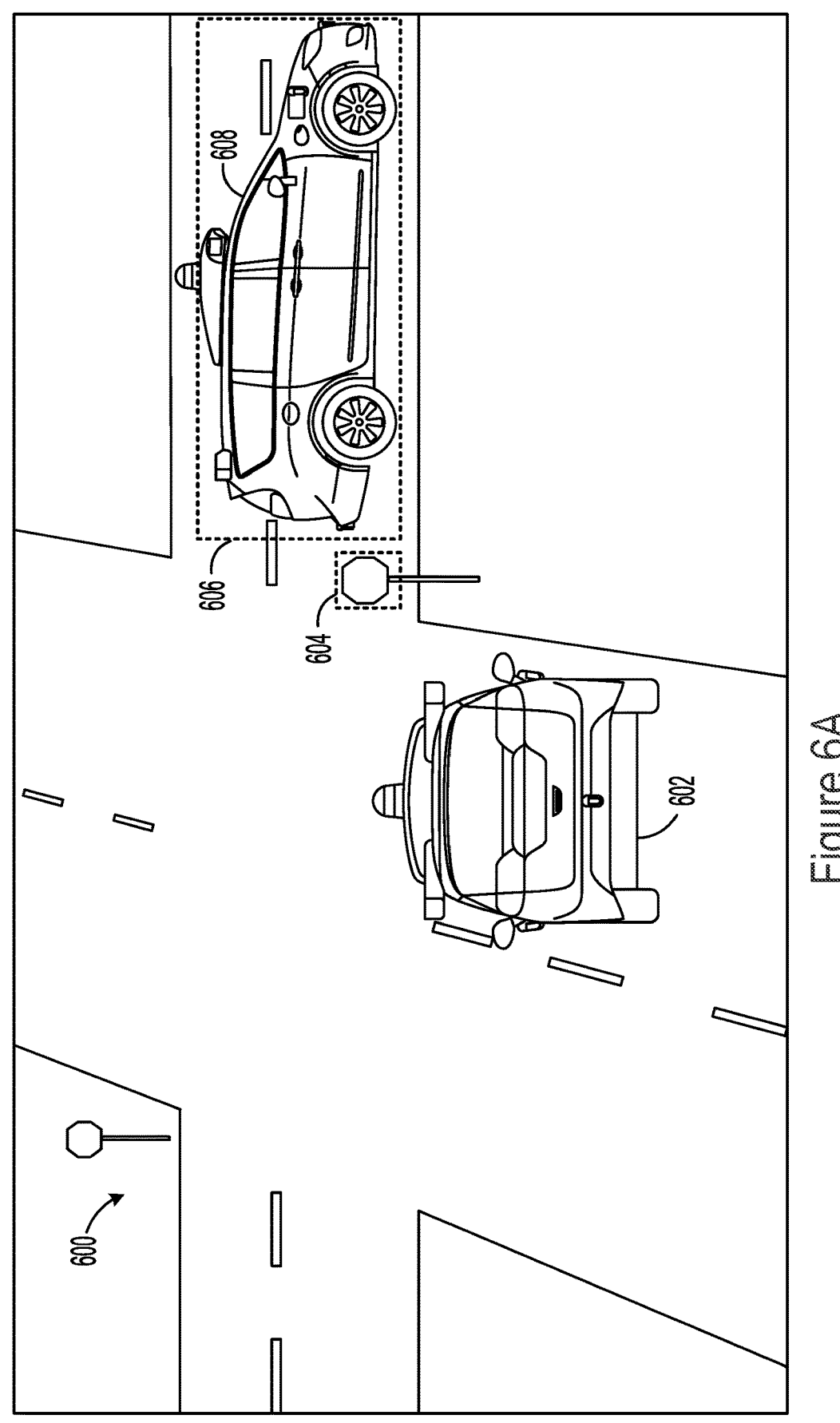
FIG. 6A illustrates a scenario involving a stranded vehicle with a sensor perspective of the environment that is partially occluded, according to one or more example embodiments.

FIGS. 6A, 6B, 6C and 6D illustrate a scenario involving a vehicle gradually adjusting vehicle sensor perspective using remote assistance, according to an example embodiment. In FIG. 6A, scenario 600 is shown from an environment perspective from the view point from behind vehicle 602. As shown in scenario 600, vehicle 602 is stopped in front of stop sign 604 at a four way intersection and is requesting remote assistance due to a sensor perspective of the environment that is partially occluded by vehicle 608. In particular, the sensor perspective for vehicle 602 lacks a clear understanding of area 606 positioned behind vehicle 608 due to the presence of vehicle 608, which may be parked or temporarily stopped at the location shown in FIG. 6A. The position and arrangement of elements within scenario 600 are shown to represent one potential situation that can occur during autonomous navigation by vehicle 602.

Without enough measurements of area 606, vehicle 602 may be configured to remain stopped until determining a safe navigation strategy. In some instances, vehicle 608 may move and vehicle 602 may resume navigation using new measurements of area 606. In other instances, after becoming stranded at the current location shown in FIG. 6A, vehicle 602 may transmit a request for assistance to a remote operator. Particularly, a vehicle system (e.g., the navigation system) from vehicle 602 may transmit the request to a remote assistance network, which may subsequently connect the vehicle system with the computing device of a remote operator that can promptly provide assistance to help vehicle systems overcome the issue.

In some embodiments, vehicle systems may be configured to request remote assistance after being stranded in the same location for a threshold duration of time (e.g., 60 seconds). The threshold duration of time can vary within examples and may depend on external factors, such as the presence of vehicles behind (or nearby) vehicle 602. For example, when a vehicle is detected behind vehicle 602, the threshold duration for requesting remote assistance may be shorter to avoid delaying the vehicle or vehicles waiting for vehicle 602 to move.

The request may include information that depicts the situation encountered by vehicle 602. For example, the request may include an indication that vehicle 602 is stopped at a particular location and include a sensor perspective of the environment as measured from the current location of vehicle 602. The sensor perspective can include a different amount of information and measurements from one or more types of sensors. In some examples, the sensor perspective can be conveyed as a 3D map of the environment generated by the sensor processing system of the vehicle using one or more types of sensors. The sensor perspective can include images or video from cameras, LIDAR measurements, radar measurements, GPS measurements, and motion measurements from inertial measurement unit (IMU).

As such, the computing device receiving the request for assistance may responsively generate a GUI that can allow for a remote operator to review the situation and provide assistance. For example, the computing device may generate a GUI similar to GUI 502 shown in FIG. 5. The GUI can convey sensor data in different arrangements and other information related to the situation (e.g., map data).

Figure 6B:
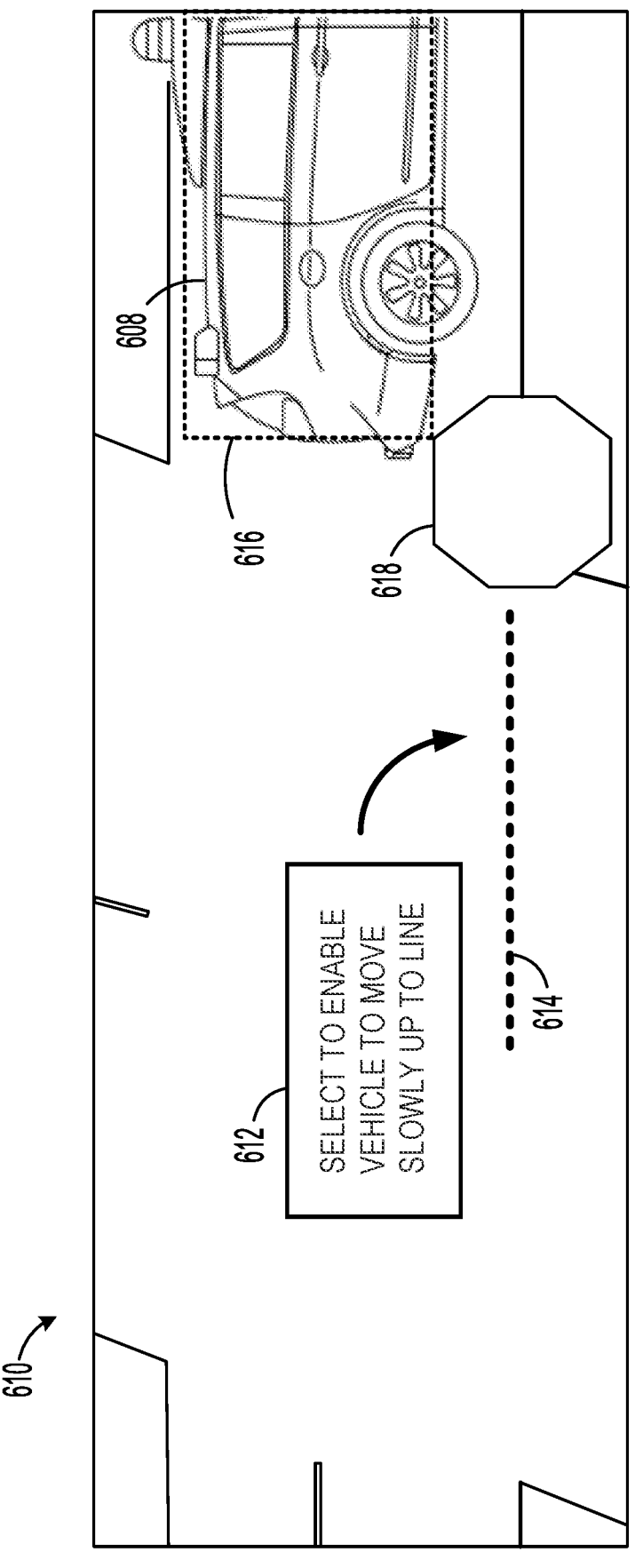
FIG. 6B illustrates a graphical user interface for providing remote assistance to the vehicle shown in FIG. 6A, according to one or more example embodiments.

FIG. 6B depicts a GUI for enabling remote assistance for the situation illustrated in FIG. 6A. Particularly, a computing device may cause GUI 610 to display on a display interface, such as a touchscreen or a high definition (HD) display. GUI 610 represents the sensor perspective (or a portion of the sensor perspective) of the environment from vehicle.

GUI 610 also shows selectable option 612 and visual line 614 virtually placed in the representation of the vehicle's sensor perspective. Selectable option 612 represents a remote assistance option for a remote operator to review to assist vehicle 602. As shown, selectable option 612 states "SELECT TO ENABLE VEHICLE TO MOVE SLOWLY UP TO LINE," with an arrow pointing to virtual line 614 but can differ in other examples. For instance, selectable option 614 may state "creep forward" or other phrases. Selection option 612 may be touched if the remote operator is using a touch screen, selected using a mouse or a pointer, picked via a button, or requested in other ways within examples. For instance, a remote operator may speak a word or phrase into a microphone to provide remote assistance. In addition, the computing device may use audio to communicate options to a remote operator. For instance, the computing device may audibly communicate the phrase shown as selectable option 612 using an audio output. In other embodiments, GUI 610 may enable a remote operator to merely draw virtual line 614 to cause vehicle 602 to slowly move forward that predefined distance. In further examples, a creep forward technique can be selected via a button.

In further examples, GUI may further include other options. For instance, GUI 610 may include a request more information option. The remote operator can use the option to obtain additional sensor data or communicate with a passenger.

The computing device may also perform image processing, computer vision, or other techniques to further enhance the remote operator's understanding of the situation. For instance, virtual box 616 is shown drawn around a portion of vehicle 608 that is blocking measurements of the environment. By using virtual boxes (e.g., virtual box 616) and other visual indications (e.g., virtual line 614), a remote operator may be informed which object is occluding the sensor perspective of the environment for vehicle 608 and also understand a strategy for resolving the issue. The remote operator can review GUI 610 and select selectable option 612 to cause vehicle 602 to move slowly a predefined distance forward represented virtually in GUI 610 by virtual line 614. Vehicle 602 may receive the remote assistance and gradually move forward as instructed while also monitoring for changes in the environment. For instance, sensors may detect vehicle 608 moved and responsively cause navigation systems to resume safe normal navigation without gradually moving forward as instructed by the remote operator. In another instances, sensors may detect other environment changes, such as a car driving nearby, a pedestrian crossing the intersection, or animal in the roadway. As a result, vehicle 602 may stop to avoid one or more detected obstacles and overrule the instructions.

In some embodiments, the computing device may use sensor data stored in memory to display prior events involving the vehicle. For instance, the computing device may display sensor data captured as a vehicle approached an intersection prior to becoming stranded due to objects blocking further measurements of an area of the environment. In addition, the computing device may supply audio from passengers or of the external environment from vehicle microphones.

Figure 6C:
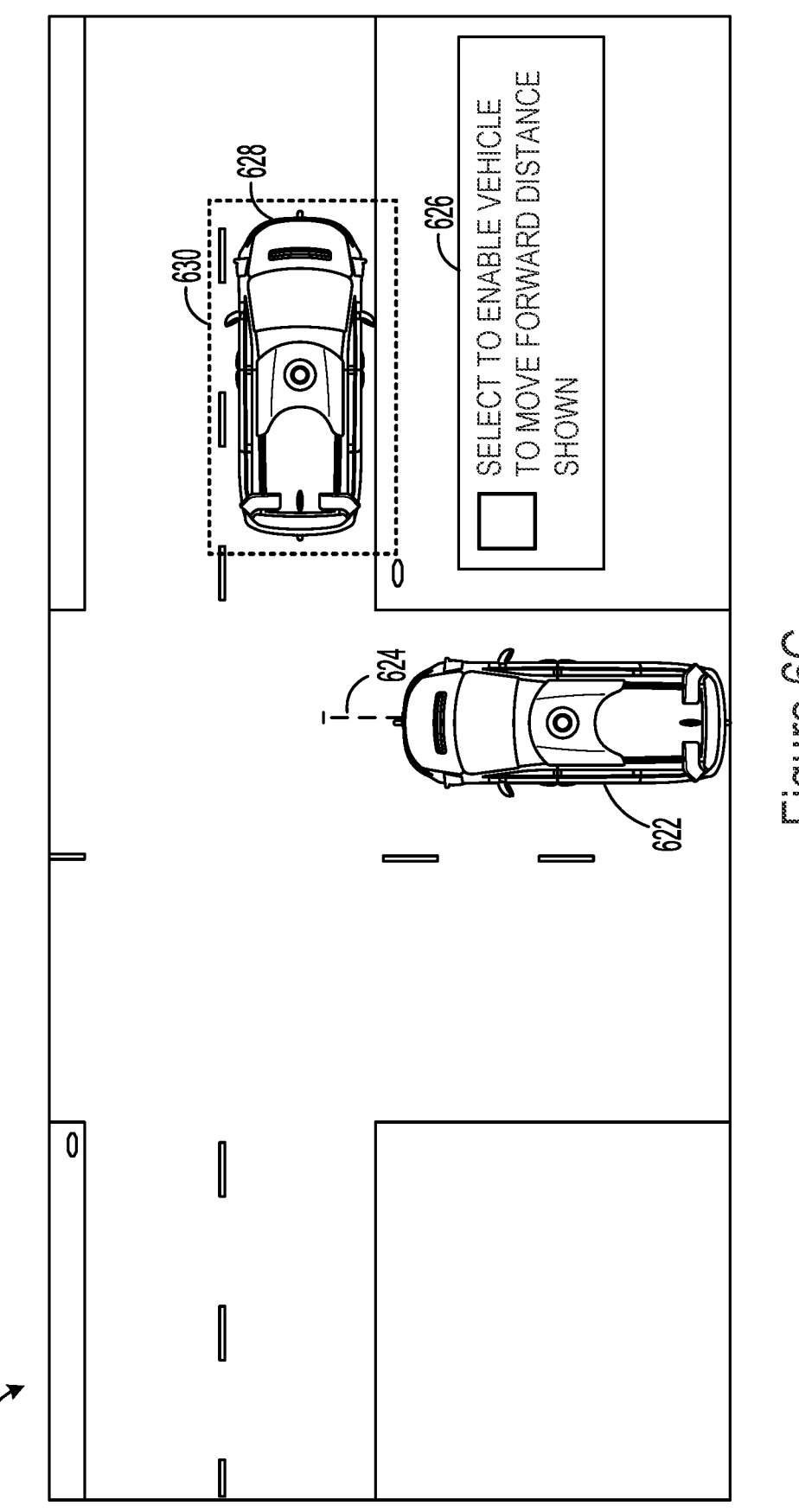
FIG. 6C illustrates another graphical user interface for providing remote assistance to the vehicle shown in FIG. 6A, according to one or more example embodiments.

FIG. 6C depicts another GUI for enabling remote assistance for the scenario shown in FIG. 6A. GUI 620 represents an environment of the vehicle 602 from an elevated viewpoint (e.g., a bird's eye view). A computing device may obtain sensor data from vehicle 602 that includes the location of vehicle 602. Using the location, the computing device may utilize map data that represents the location and the sensor data to generate GUI 620 using the elevated perspective.

As shown, the elevated viewpoint shows vehicle 622 and vehicle 628, which represent the locations of vehicle 602 and vehicle 608, respectively. In addition, similar to GUI 610 shown in FIG. 6B, GUI 620 includes selectable option 626 to represent how the remote operator can assist vehicle 602 and virtual box 630 boxed around vehicle 628 to convey to the remote operator that vehicle 608 is blocking part of the sensor measurements of vehicle 602 in scenario 600. In some examples, GUI 620 or other GUIs described herein may further include text (or show text if objects are selected) that indicates vehicle 608 (represented by vehicle 628 for GUI 620) is the source of the occlusion and cause of the request for assistance by vehicle 602.

GUI 620 also includes virtual line 624 to represent a predefined distance (e.g., a few centimeters or meters) that selectable option 626 may cause vehicle 602 to move forward in the environment to gradually adjust sensor perspective. The computing device may determine the predefined distance based on positioning of vehicle 622 and vehicle 628 represented via GUI 620 or other factors and responsively display virtual line 624 to represent the distance. In other examples, the predefined distance may be preconfigured or preset by an administrator. In other examples, the remote operator may first draw virtual line 624 and subsequently select selectable option 626 to confirm that virtual line 624 was accurately placed. Such a configuration may enable the remote operator to have greater influence on the operations of vehicle 602.

Figure 6D:
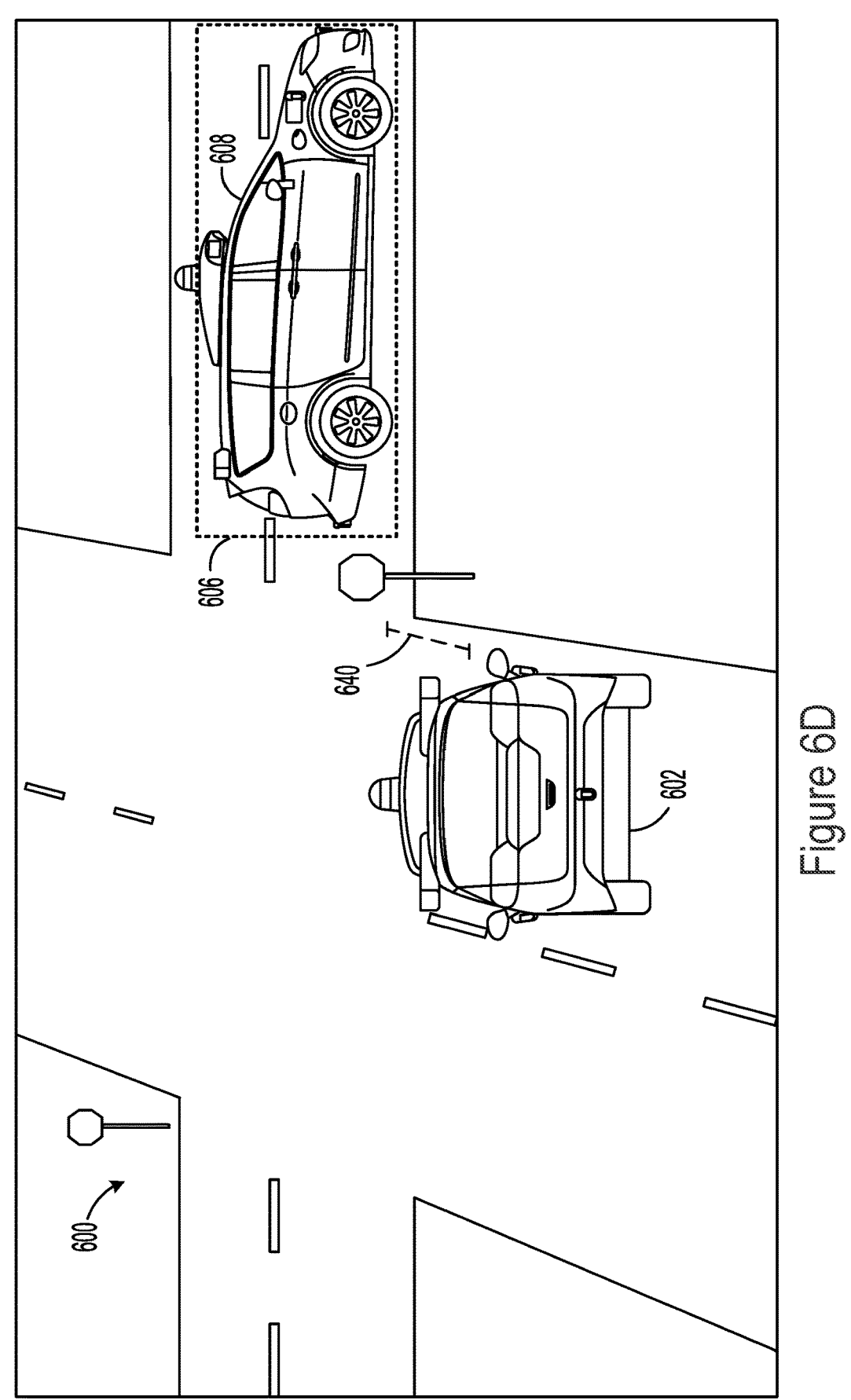
FIG. 6D further illustrates the scenario shown in FIG. 6A after the vehicle received remote assistance, according to one or more example embodiments.

FIG. 6D shows an indication of predefined distance 640 that vehicle 602 is configured to gradually move in response to receiving corresponding instructions from a remote operator. Particularly, predefined distance 640 may represent a distance that vehicle 602 is configured to gradually move after receiving instructions provided by a remote operator. While gradually moving forward predefined distance 640 towards a center of the intersection, the sensor perspective also gradually changes. In some instances, the sensor perspective for vehicle 602 may adjust enough to capture measurements of area 606 without interference from vehicle 608.

In other instances, however, vehicle 602 may travel predefined distance 640 and its sensor perspective may still be occluded by vehicle 608. In such a situation, vehicle 602 may transmit another request for additional assistance from the remote operator, who may in turn use the interface provided by the computing device to instruct vehicle 602 to move another predefined distance further to see if that helps improve the vehicle's sensor perspective of the environment. In addition, vehicle 602 may continue to measure the environment prior to, during, and after moving forward to ensure safety. In some instances, the environment might change in a way that causes vehicle 602 to stop moving. In such a situation, vehicle 602 may overrule instructions from the remote operator or temporarily pause performance of the instructions. Vehicle 602 may request for further assistance if stranded again and/or if enough time passed since receiving the original assistance from the operator (e.g., a threshold period of time has passed).

Figure 7A:
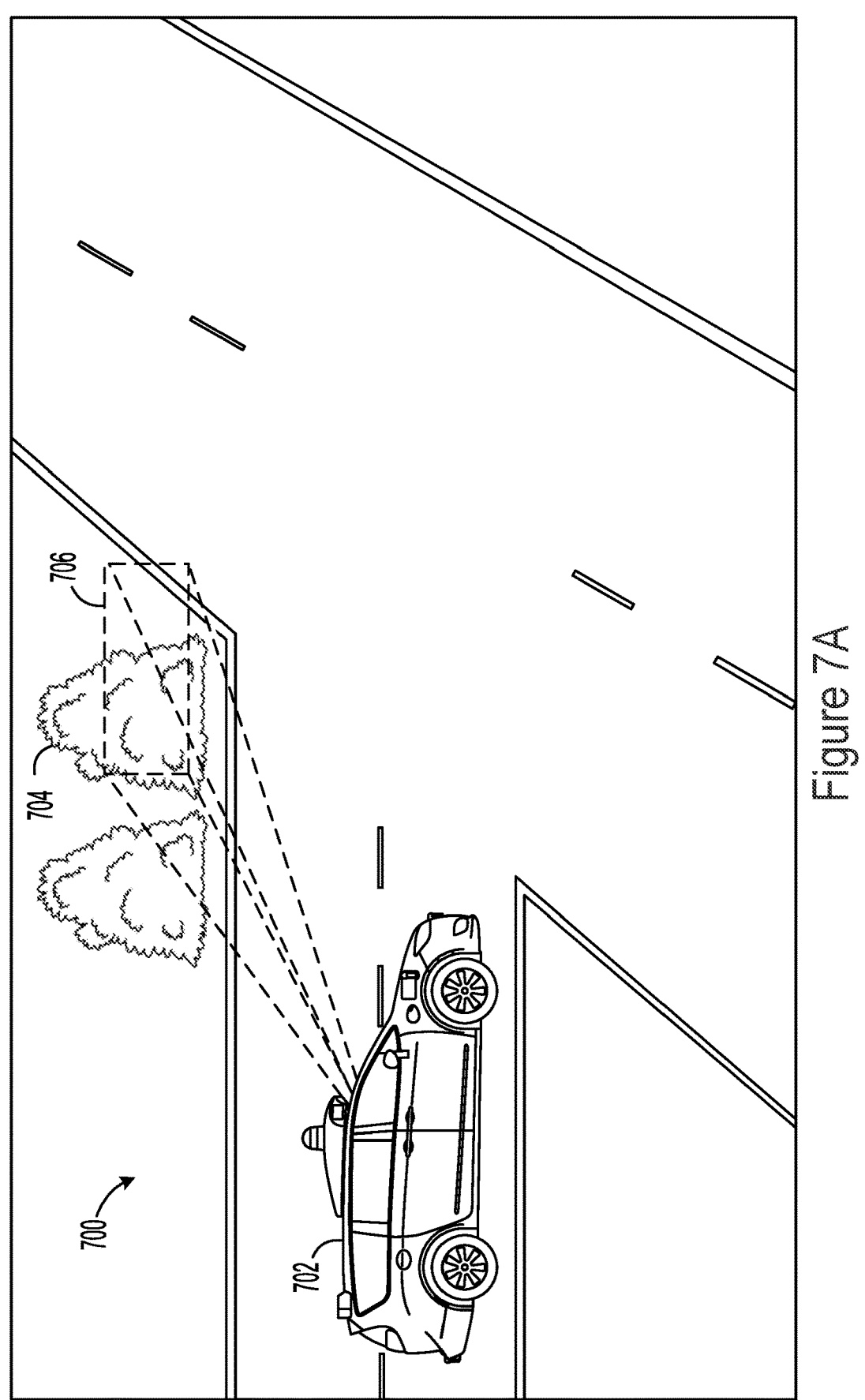
FIG. 7A illustrates another scenario involving a vehicle requesting remote assistance, according to one or more example embodiments.
Figure 7B:
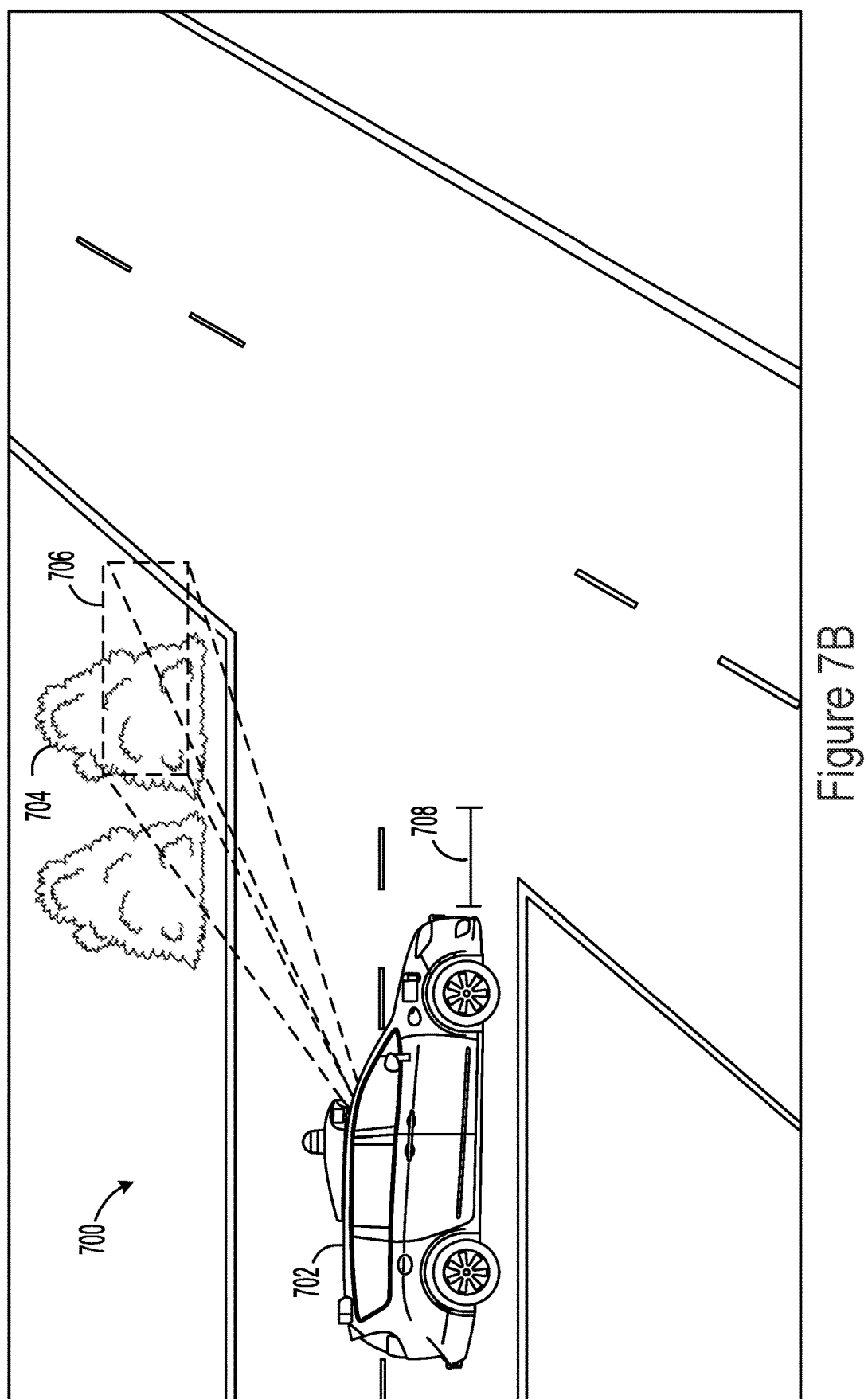
FIG. 7B illustrates the vehicle receiving remote assistance in the scenario shown in FIG. 7A, according to one or more example embodiments.
Figure 7C:
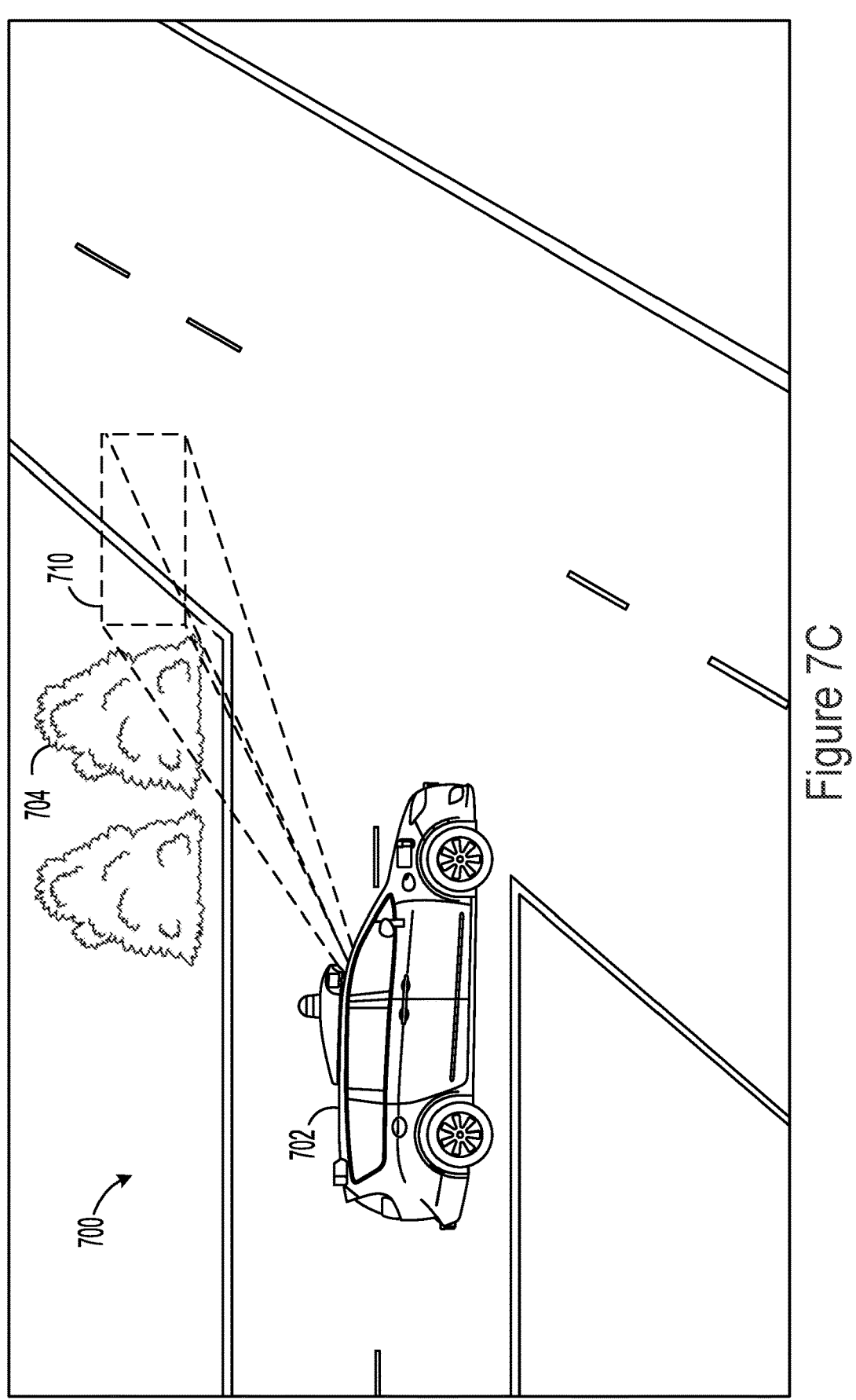
FIG. 7C further illustrates the scenario shown in in FIGS. 7A and 7B with the vehicle gradually adjusting sensor perspective based on remote assistance, according to one or more example embodiments.

FIGS. 7A, 7B, and 7C illustrate a scenario involving a vehicle gradually adjusting vehicle sensor perspective using remote assistance, according to one or more example embodiments. In FIG. 7A, scenario 700 shows vehicle 702 stopped with sensor perspective 706 of the environment blocked by shrub 704. Vehicle 702 may be stopped because shrub 704 is preventing vehicle 702 from determining if potential objects are in that area of the environment, such as a vehicle traveling down that road. As such, vehicle 702 may request remote assistance as described herein.

A remote operator may provide remote assistance to vehicle 702. For instance, FIG. 7B depicts predefined distance 708 positioned in front of vehicle 702. Vehicle 702 may receive instructions from a remote operator to slowly navigate forward for predefined distance 708 while monitoring the environment. Predefined distance 708 can be preset or can be determined by either vehicle 702, the remote computing device, or the remote operator based on sensor data or other information.

FIG. 7C further shows vehicle 702 at a subsequent location after moving forward predefined distance 708. At the subsequent location, vehicle's 702 new sensor perspective 710 includes measurements that avoid shrub 704. Vehicle 702 may subsequently be able to navigate safely using new sensor perspective 710, which involves measurements of the road positioned behind shrub 704.

FIG. 8 is a flow chart of a method for using remote assistance to gradually adjust the sensor perspective of a vehicle, according to example implementations. Method 800 represents an example method that may include one or more operations, functions, or actions, as depicted by one or more of blocks 802, 804, and 806, each of which may be carried out by any of the systems, devices, and/or vehicles shown in FIGS. 1-7C, among other possible systems. For instance, system 400 depicted in FIG. 4 may enable execution of method 800.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 802, method 800 involves receiving a request for assistance from a vehicle operating in an environment. In some examples, the request indicates that the vehicle is stopped at a location with a sensor perspective of the environment that is at least partially occluded. The interface by one or more objects in the environment may limit the vehicle's understanding of the surrounding environment. As a result, the vehicle may remain stationary and request remote assistance.

In some examples, the vehicle may transmit the request after a threshold duration of time has passed since the vehicle initially became stranded. For example, the vehicle may request assistance after 60 seconds has passed because the environment might change during the 60 seconds that enables the vehicle to safely proceed with navigation without remote assistance.

At block 804, method 800 involves displaying a graphical user interface (GUI) that represents a current state of the vehicle and includes an selectable option configured to enable the vehicle to gradually move forward a predefined distance. The current state of the vehicle may be represented based on sensor data and other information received from the vehicle. In addition, the selectable option may depend on the particular situation encountered by the vehicle.

In some examples, the computing device may display the GUI such that the selectable is selectable only for a threshold quantity of selections within a predefined duration of time. For example, the computing device may use the limitation option to prevent a human operator from selecting the option three or more times within a two minute window. In addition, the computing device may also receive a suggested distance for gradually moving forward from the vehicle. Based on the suggested distance, the computing device may determine the predefined distance.

At block 806, method 800 involves transmitting, to the vehicle, instructions that enable the vehicle to gradually move forward the predefined distance. The computing device may transmit the instructions based on detecting a selection of the selectable option. In particular, the remote operator may review the situation as presented via the GUI and subsequently select the selectable option to provide remote assistance to the vehicle.

After receiving the instructions, the vehicle may be configured to gradually move forward the predefined distance based on the instructions while also monitoring for one or more changes in the environment. Particularly, monitoring the environment using one or more vehicle sensors can enable vehicle systems to stop moving forward (or in another direction) when needed to maintain safety.

In some examples, the computing device may also receive sensor data representing the sensor perspective of the environment and further display the sensor perspective of the environment based on the sensor data when displaying the GUI that represents the current state of the vehicle and includes the selectable option. In addition, the computing device may also obtain map data based on the location of the vehicle. Using the map data, the computing device may display an elevated view of the vehicle at the location estimated based on the map data and the sensor data. In some examples, the computing device may determine the predefined distance based on one or both of the sensor data and the map data.

The computing device may receive a second request from the vehicle in some instances. The second request can include an indication that the vehicle is stopped at a second location with a second sensor perspective of the environment that is at least partially occluded after gradually moving forward the predefined distance from the location. Responsive to receiving the second request for assistance, the computing device may display a second GUI that represents a new state of the vehicle and includes a second selectable option configured to enable the vehicle to gradually move forward a second predefined distance. In some instances, the second predefined distance is less than the predefined distance.

In some examples, the computing device may receive sensor data representing the sensor perspective of the environment from the vehicle. The computing device may identify one or more objects causing the sensor perspective of the environment that is at least partially occluded based on the sensor data. As such, the computing device may display the GUI with the sensor perspective of the environment with boxes outlining the one or more objects identified as causing the occlusion. In addition, the computing device may also display the GUI such that the GUI includes a visual indication of the predefined distance positioned virtually relative to the sensor perspective of the environment.

Figure 9:
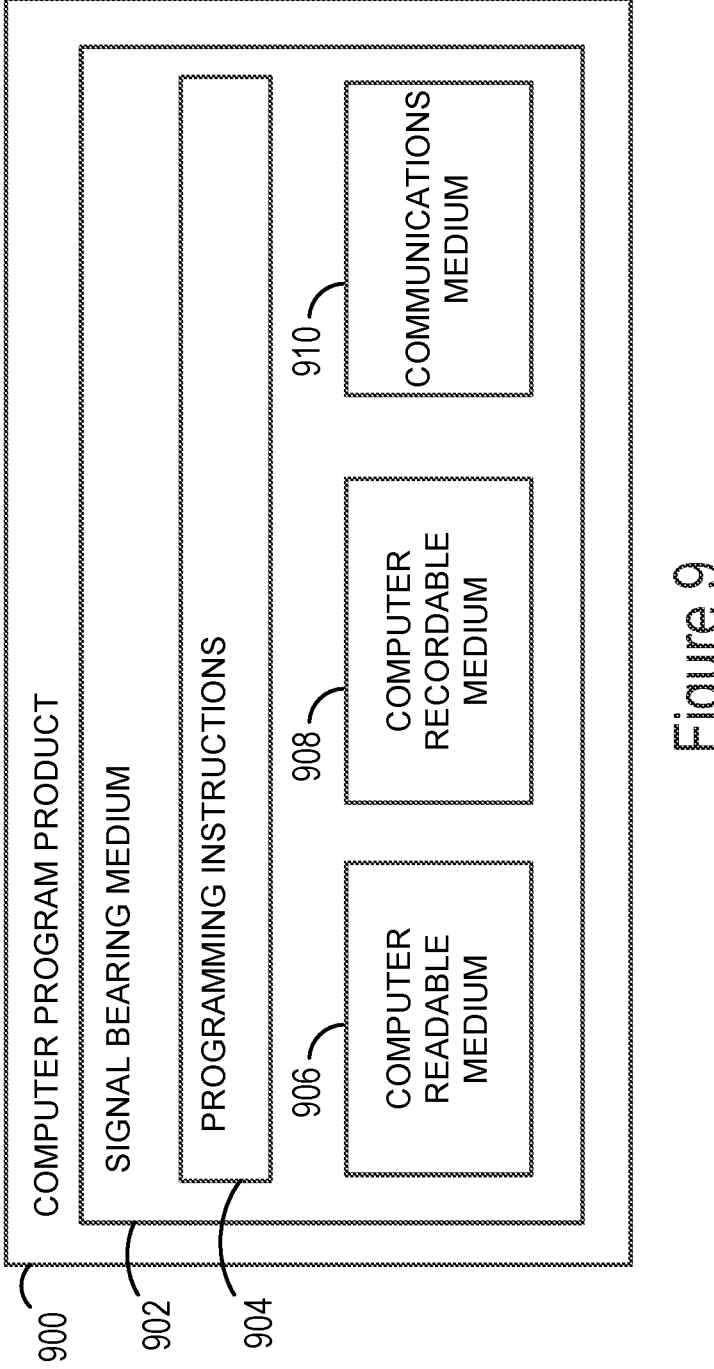
FIG. 9 is a schematic diagram of a computer program, according to example implementations.

FIG. 9 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 9, computer program product 900 is provided using signal bearing medium 902, which may include one or more programming instructions 904 that, when executed by one or more processors may provide functionality or portions of the functionality described above with respect to FIGS. 1-7C.

Signal bearing medium 902 may encompass a non-transitory computer-readable medium 906, such as, but not limited to, a hard disk drive, a Compact Disc (CD), a Digital Video Disk (DVD), a digital tape, memory, components to store remotely (e.g., on the cloud) etc. In some implementations, signal bearing medium 902 may encompass computer recordable medium 908, such as, but not limited to, memory, read/write (R/W) CDs, R/W DVDs, etc.

In some implementations, signal bearing medium 902 may encompass communications medium 910, such as, but not limited to, a digital and/or an analog communication medium (e.g., a fiber optic cable, a waveguide, a wired communications link, a wireless communication link, etc.). Similarly, signal bearing medium 902 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 902 may be conveyed by a wireless form of communications medium 910.

One or more programming instructions 904 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 904 conveyed to the computer system by one or more of computer readable medium 906, computer recordable medium 908, and/or communications medium 910. The non-transitory computer readable medium could also be distributed among multiple data storage elements and/or cloud (e.g., remotely), which could be remotely located from each other. Computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, at a computing device, a request for assistance from a vehicle operating in an environment, wherein the request includes sensor data from the vehicle, and wherein the computing device is positioned at a remote location away from the vehicle;
displaying, based on the request for assistance, a graphical user interface (GUI) that shows a sensor perspective of the environment of the vehicle with a selectable option configured to instruct the vehicle to move a predefined distance below a threshold speed, wherein the computing device is configured to use the sensor data received from the vehicle to determine a distance and a direction for the predefined distance associated with the selectable option by analyzing the sensor data to detect an occlusion affecting the sensor perspective of one or more vehicle sensors;
receiving, at the computing device and via an input interface, an operator input selecting the selectable option; and
transmitting, by the computing device, instructions to the vehicle to move the predefined distance.

2. The method of claim 1, further comprising:
displaying the GUI showing changes in the sensor perspective of the environment of the vehicle as the vehicle moves the predefined distance below the threshold speed.

3. The method of claim 1, wherein transmitting instructions to the vehicle to move the predefined distance comprises:
transmitting instructions to the vehicle to move forward the predefined distance.

4. The method of claim 1, wherein transmitting instructions to the vehicle to move the predefined distance comprises:
transmitting instructions to the vehicle to move backwards the predefined distance.

5. The method of claim 1, further comprising:
determining the predefined distance based on one or more environment conditions of the environment of the vehicle.

6. The method of claim 1, further comprising:
determining whether the vehicle should move forward or backward the predefined distance below the threshold speed based on determining that at least one sensor of the vehicle is occluded.

7. The method of claim 1, further comprising:
receiving a location of the vehicle with the request for assistance; and
determining the predefined distance based on one or both of the sensor data and map data.

8. The method of claim 1, further comprising:
receiving, from the vehicle, a suggested distance for the vehicle to move; and
determining, based on the suggested distance, the predefined distance.

9. The method of claim 1, further comprising:
receiving a second request for assistance from the vehicle subsequent to the vehicle moving the predefined distance; and
displaying, based on the second request for assistance, a second GUI that represents a new state of the vehicle and includes a second selectable option configured to enable the vehicle to move forward a second predefined distance.

10. The method of claim 9, wherein the second predefined distance is less than the predefined distance.

11. The method of claim 1, wherein displaying the GUI that shows the sensor perspective of the environment of the vehicle with the selectable option comprises:
displaying the selectable option for a threshold duration after receiving the request for assistance.

12. The method of claim 1, wherein displaying the GUI that shows the sensor perspective of the environment of the vehicle with the selectable option comprises:
displaying the GUI with a visual indication of the predefined distance overlaid upon the sensor perspective of the environment, wherein the visual indication of the predefined distance is a virtual line positioned relative to the vehicle in the sensor perspective of the environment.

13. The method of claim 1, wherein transmitting the instructions to the vehicle to move the predefined distance comprises:
transmitting given instructions that cause the vehicle to move the predefined distance, wait a threshold time, and move a second predefined distance.

14. The method of claim 1, wherein displaying the GUI that shows the sensor perspective of the environment of the vehicle with the selectable option comprises:
displaying the selectable option with instructions to draw a line to convey the predefined distance.

15. The method of claim 1, wherein the vehicle is configured to move the predefined distance while also monitoring for one or more changes in the environment responsive to receiving the instructions, and wherein the vehicle is further configured to stop moving the predefined distance based on detecting one or more changes in the environment.

16. A system comprising:
a vehicle; and
a computing device positioned at a remote location away from the vehicle, wherein the computing device is configured to:
receive a request for assistance from the vehicle operating in an environment, wherein the request includes sensor data from the vehicle;
display, based on the request for assistance, a graphical user interface (GUI) that shows a sensor perspective of the environment of the vehicle with a selectable option configured to instruct the vehicle to move a predefined distance below a threshold speed, wherein the computing device is configured to use the sensor data received from the vehicle to determine a distance and a direction for the predefined distance associated with the selectable option by analyzing the sensor data to detect an occlusion affecting the sensor perspective of one or more vehicle sensors;

receive, via an input interface, an operator input selecting the selectable option; and transmit instructions to the vehicle to move the predefined distance.

17. The system of claim 16, wherein the computing device and the vehicle communicate via secure wireless communication.

18. The system of claim 16, wherein the computing device is a wearable computing device.

19. The system of claim 16, wherein the predefined distance is based on a weather condition of the environment.

20. A non-transitory computer readable medium configured to store instructions, that when executed by a computing system, causes the computing system to perform operations comprising:

receiving a request for assistance from a vehicle operating in an environment, wherein the request includes sensor data from the vehicle;

displaying, based on the request for assistance, a graphical user interface (GUI) that shows a sensor perspective of the environment of the vehicle with a selectable option configured to instruct the vehicle to move a predefined distance below a threshold speed, wherein the computing system is configured to use the sensor data to determine a distance and a direction for the predefined distance associated with the selectable option by analyzing the sensor data to detect an occlusion affecting the sensor perspective of one or more vehicle sensors;

receiving, via an input interface, an operator input selecting the selectable option; and transmitting instructions to the vehicle to move the predefined distance, wherein the computing system is positioned at a remote location away from the vehicle.

* * * * *